(12) United States Patent
Erickson et al.

(10) Patent No.: US 7,467,295 B2
(45) Date of Patent: Dec. 16, 2008

(54) DETERMINING A BOOT IMAGE BASED ON A REQUESTING CLIENT ADDRESS

(75) Inventors: Steven C. Erickson, Rochester, MN (US); David Joseph Gimpl, Rochester, MN (US); Fraser Allan Syme, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 11/246,832

(22) Filed: Oct. 7, 2005

(65) Prior Publication Data

US 2007/0083748 A1    Apr. 12, 2007

(51) Int. Cl.
*G06F 9/00* (2006.01)
*G06F 9/24* (2006.01)
*G06F 15/177* (2006.01)

(52) U.S. Cl. .................................. 713/2; 713/1; 713/100
(58) Field of Classification Search ........................ 713/2
See application file for complete search history.

(56) References Cited

U.S. PATENT DOCUMENTS 6,810,478 B1 * 10/2004 Anand et al. .................... 713/2
2002/0078188 A1 * 6/2002 Anand et al. ................. 709/222
2002/0198972 A1 * 12/2002 Babbitt et al. ................ 709/222
2004/0186930 A1 * 9/2004 Gadkari et al. ................ 710/22
2006/0200539 A1 * 9/2006 Kappler et al. ............... 709/220

* cited by examiner

*Primary Examiner*—Rehana Perveen
*Assistant Examiner*—Michael J Brown
(74) *Attorney, Agent, or Firm*—Owen J. Gamon

(57) ABSTRACT

A method, apparatus, system, and signal-bearing medium that, in an embodiment, receive a command that requests a name of a boot image and a network address of a boot server that contains the boot image, invoke a plug-in to determine the name of the boot image and the network address of the boot server based on an address of a client that sent the command, and send the name of the boot image and the network address of the boot server to a client that sent the command. In various embodiments, the address of the client may be a network address or a MAC (Media Access Control) address. The client retrieves the boot image via the name and the network address of the boot server, and the boot image initializes the client when executed at the client. In various embodiments, the name of the boot image or the network address of the boot server are changed to second names or addresses and sent to the client in response to another command.

10 Claims, 4 Drawing Sheets

BOOT TABLE 164

| CLIENT MAC 220 | CLIENT NETWORK ADDRESS 225 | OPTIONS 230 | BOOT IMAGE FILE NAME 235 | BOOT IMAGE NETWORK ADDRESS 240 | |
|---|---|---|---|---|---|
| 1234567890AB | 127.0.0.1 | | BIOS | 145.0.2.3 | 205 |
| 0987654321BC | 232.6.8.3 | | LINUX | 221.0.8.4 | 210 |
| 387651234DAB | 1.6.321.5 | | WINDOWS ENTERPRISE SERVER | 238.3.1.4 | 215 |

FIG. 2

DETERMINING A BOOT IMAGE BASED ON A REQUESTING CLIENT ADDRESS

FIELD

This invention generally relates to computer systems and more specifically relates to determining a boot image and server that contains the boot image for a client based on the address of the client.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Today's more powerful computers are often connected in networks, and a user at one computer, often called a client, may wish to access information at multiple other computers, often called servers, via a network. The network may be a local network that connects computers associated with the same company, e.g., a LAN (Local Area Network), or it may be an external network, such as the Internet or World Wide Web, that connects computers from disparate users and companies. Further, the network may be a combination of local and external networks. Companies typically have multiple computers containing different hardware and software packages attached to these networks.

Computers attached to a network often boot up (or initialize) using various standard protocols, such as PXE or BOOTP. PXE (PreBoot Execution Environment) allows a computer to boot from a server on the network prior to booting the operating system on a storage device local to the computer. A PXE-enabled computer connects its NIC (Network Interface Card) to the LAN (Local Area Network), which keeps the computer connected to the network even when the power is off. Bootp (Bootstrap Protocol) is an Internet protocol that enables a diskless computer to discover its own IP (Internet Protocol) address, the IP address of a BOOTP server on the network, and a file to be loaded into memory to boot the machine. Bootp enables the computer to boot without requiring a hard or floppy disk drive. The Bootp protocol is defined by RFC (Request for Comments) 951. DHCP (Dynamic Host Configuration Protocol) is a protocol for assigning dynamic IP addresses to devices on a network. With dynamic addressing, a device can have a different IP address every time it connects to the network. DHCP also supports a mix of static and dynamic IP addresses. Dynamic addressing simplifies network administration because the software keeps track of IP addresses rather than requiring an administrator to manage the task. This means that a new computer can be added to a network without manually assigning it a unique IP address.

The DHCP/PXE implementations require that resource allocations are pre-configured in a configuration file that ties the boot server and image resources to specific MAC addresses, IP addresses, or networks. This is a disadvantage in a dynamic manufacturing environment because manually modifying this configuration file for hundreds or thousands of clients that are being manufactured at the same time is not possible, especially when each client may need to boot multiple boot images during the manufacturing process. And in most cases, the DHCP/PXE daemon programs need to be restarted to retrieve changes to the configuration files, which means that other requests cannot be satisfied during the restart process.

Today, in a manufacturing environment, an ability is needed to move, add, and remove boot servers that clients use to boot from without affecting dynamic production workloads. Current techniques for addressing this problem require an investment in a dedicated network infrastructure, such as separate subnet, switches, and boot servers dedicated to specific clients, which can lead to an uneven distribution of workload across all server assets in a location. This approach also requires that each boot server maintain a copy of all possible resources because the clients do not have the flexibility to access the best server for a given resource requirement.

Thus, a need exists for an improved technique for booting clients from boot servers.

SUMMARY

A method, apparatus, system, and signal-bearing medium are provided that, in an embodiment, receive a command that requests a name of a boot image and a network address of a boot server that contains the boot image, invoke a plug-in to determine the name of the boot image and the network address of the boot server based on an address of a client that sent the command, and send the name of the boot image and the network address of the boot server to a client that sent the command. In various embodiments, the address of the client may be a network address or a MAC (Media Access Control) address. The client retrieves the boot image via the name and the network address of the boot server, and the boot image initializes the client when executed at the client. In various embodiments, the name of the boot image or the network address of the boot server are changed to second names or addresses and sent to the client in response to another command.

BRIEF DESCRIPTION OF THE DRAWINGS

Various embodiments of the present invention are hereinafter described in conjunction with the appended drawings:

FIG. 2 depicts a block diagram of an example data structure for a boot table, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a boot service receives a command from a client that requests a name of a boot image and a network address of a boot server that contains the boot image. The boot service determines, via a plug-in, the name of the boot image and the network address of the boot server based on an address of the client that sent the command. The boot service further sends the name of the boot image and the network address of the boot server to a client that sent the command. In various embodiments, the address of the client may be a network address or a MAC (Media Access Control) address. The client retrieves the boot image via the name of the boot image and the network address of the boot server, and the boot image initializes the client when executed at the client. In various embodiments, a process controller may change the name of the boot image or the network address of the boot server that contains the boot image to the next name or address in a manufacturing, test, or installation sequence, in order to send different boot images to the client at different times. Hence, the boot image associated with the address of the client changes over time. Thus, dynamic allocation of the boot server and boot image are possible without needing to manually modify hard-coded DHCP configuration files.

Figure 1:
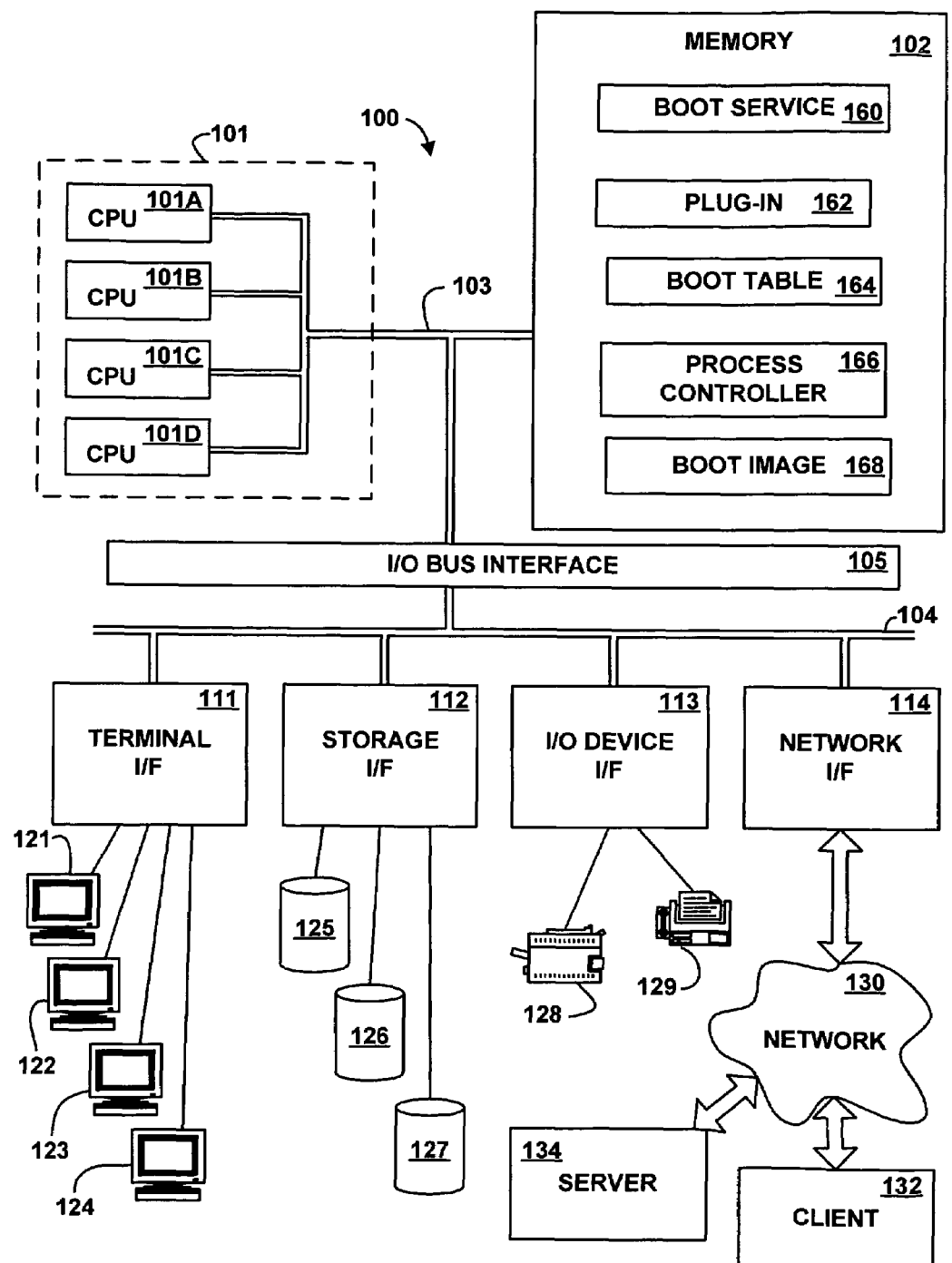
FIG. 1 depicts a high-level block diagram of an example system for implementing an embodiment of the invention.

Referring to the Drawings, wherein like numbers denote like parts throughout the several views, FIG. 1 depicts a high-level block diagram representation of a boot server computer system 100 connected via a network 130 to clients 132 and servers 134, according to an embodiment of the present invention. The terms "computer," "client," and "server" are used for convenience only, and an electronic device that acts as a server in one embodiment may act as a client in another embodiment, and vice versa. In an embodiment, the hardware components of the boot server computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the boot server computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The boot server computer system 100 contains one or more general-purpose programmable central processing units (CPUs) 101A, 101B, 101C, and 101D, herein generically referred to as the processor 101. In an embodiment, the boot server computer system 100 contains multiple processors typical of a relatively large system; however, in another embodiment the boot server computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the boot server computer system 100, and may also include the virtual memory of other computer systems coupled to the boot server computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes a boot service 160, a plug-in 162, a boot table 164, a process controller 166, and a boot image 168. Although the boot service 160, the plug-in 162, the boot table 164, the process controller 166, and the boot image 168 are illustrated as being contained within the memory 102 in the boot server computer system 100, in other embodiments some or all of them may be on different computer systems (for example, the servers 134) and may be accessed remotely, e.g., via the network 130. The boot server computer system 100 may use virtual addressing mechanisms that allow the programs of the boot server computer system 100 to behave as if they only have access to a large, single storage entity instead of access to multiple, smaller storage entities. Thus, while the boot service 160, the plug-in 162, the boot table 164, the process controller 166, and the boot image 168 are illustrated as being contained within the main memory 102, these elements are not necessarily all completely contained in the same storage device at the same time. Further, although the boot service 160, the plug-in 162, the boot table 164, the process controller 166, and the boot image 168 are illustrated as being separate entities, in other embodiments some of them, or portions of some of them, may be packaged together.

The boot service 160 provides the boot image 164 to the client computer system 132 via the boot table 164 and the plug-in 162. In an embodiment, the boot service 160 implements a DHCP/PXE protocol, but in other embodiments any appropriate protocol may be used. The plug-in 162 selects a boot image 164 via the boot table 164. The boot table 164 includes information capable of being used to access the client computer system 132 and the boot image 164. The boot table 164 is further described below with reference to FIG. 2. In another embodiment, the boot table 164 is not necessary, and the plug-in 162 may dynamically assign values back to the boot service 160. The process controller 166 updates the contents of the boot table 164. The boot image 168 includes an operating system or other instructions capable of booting or initializing the client computer system 132.

The boot service 160, the plug-in 162, and/or the process controller 166 may include instructions capable of executing on the processor 101 or statements capable of being interpreted by instructions executing on the processor 101 to perform the functions as further described below with reference to FIGS. 3 and 4. In another embodiment, the boot service 160, the plug-in 162, and/or the process controller 166 may be implemented in microcode or firmware. In another embodiment, the boot service 160, the plug-in 162, and/or the process controller 166 may be implemented in hardware via logic gates and/or other appropriate hardware techniques in lieu of or in addition to a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interfaces 113 provide an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the boot server computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the boot server computer system 100 may in fact contain multiple VO bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The boot server computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The boot server computer system 100 may alternatively be a single-user system, typically containing only a single user display and keyboard input, or might be a server or similar device which has little or no direct user interface, but receives requests from other computer systems (clients). In other embodiments, the boot server computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the boot server computer system 100. In various embodiments, the network 130 may represent a storage device or a combination of storage devices, either connected directly or indirectly to the boot server computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The clients 132 may include some or all of the hardware and/or software elements previously described above for the boot server computer system 100. The server computer system 134 may include some or all of the hardware, data, and/or software elements previously described above for the boot server computer system 100. Although the server computer system 134 is illustrate as being separate from the boot server computer system 100, in another embodiment they may be implemented together. In another embodiment, the server computer system 134 is optional, not present, or not used.

It should be understood that FIG. 1 is intended to depict the representative major components of the boot server computer system 100, the network 130, the clients 132, and the servers 134 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the boot server computer system 100, and that, when read and executed by one or more processors 101 in the boot server computer system 100, cause the boot server computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the boot server computer system 100, via a variety of tangible signal-bearing media, which include, but are not limited to the following computer-readable media:

(1) information permanently stored on a non-rewriteable storage medium, e.g., a read-only memory storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmissions medium, such as through a computer or a telephone network, e.g., the network 130.

The tangible signal-bearing media may be operatively and communicatively connected (directly or indirectly) to a processing unit, such as the processor 101. Such tangible signal-bearing media, when carrying or encoded with computer-readable, processor-readable, or machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of an example data structure for a boot table 164, according to an embodiment of the invention. The boot table 164 includes records 205, 210, and 215, but in other embodiments any number of records with any appropriate data may be present. Each of the records 205, 210, and 215 includes a client MAC (Media Access Control) address field 220, a client network address field 225, an options field 230, a boot image file name field 235, and a boot image network address field 240.

The client MAC address 220 is a hardware address unique to each network interface on the client computer system 132 and is typically defined by the manufacturer of the network interface device or the entire client computer system 132. The client MAC address 220 typically includes a portion that is unique to the manufacturer of the network interface hardware in the client computer system 132 and another portion that is unique to the interface hardware device (in the client computer system 132). The client network address field 225 identifies the client computer system 132 as a node on the network 130. In an embodiment, the client network address field 225 includes an IP (Internet Protocol) address, but in other embodiments any appropriate protocol may be used. The options field 230 may include any data supplied by the client computer system 132, e.g., in a PXE request packet, but in other embodiments any appropriate protocol may be used.

The boot image file name 235 identifies the boot image 168 and, in various embodiments, may be an unqualified name, a partially qualified name, or a fully-qualified name, such as a name that includes a path or directory structure. The boot image network address 240 identifies the network address of the boot server computer system 100 that includes the boot image 168.

Figure 3:
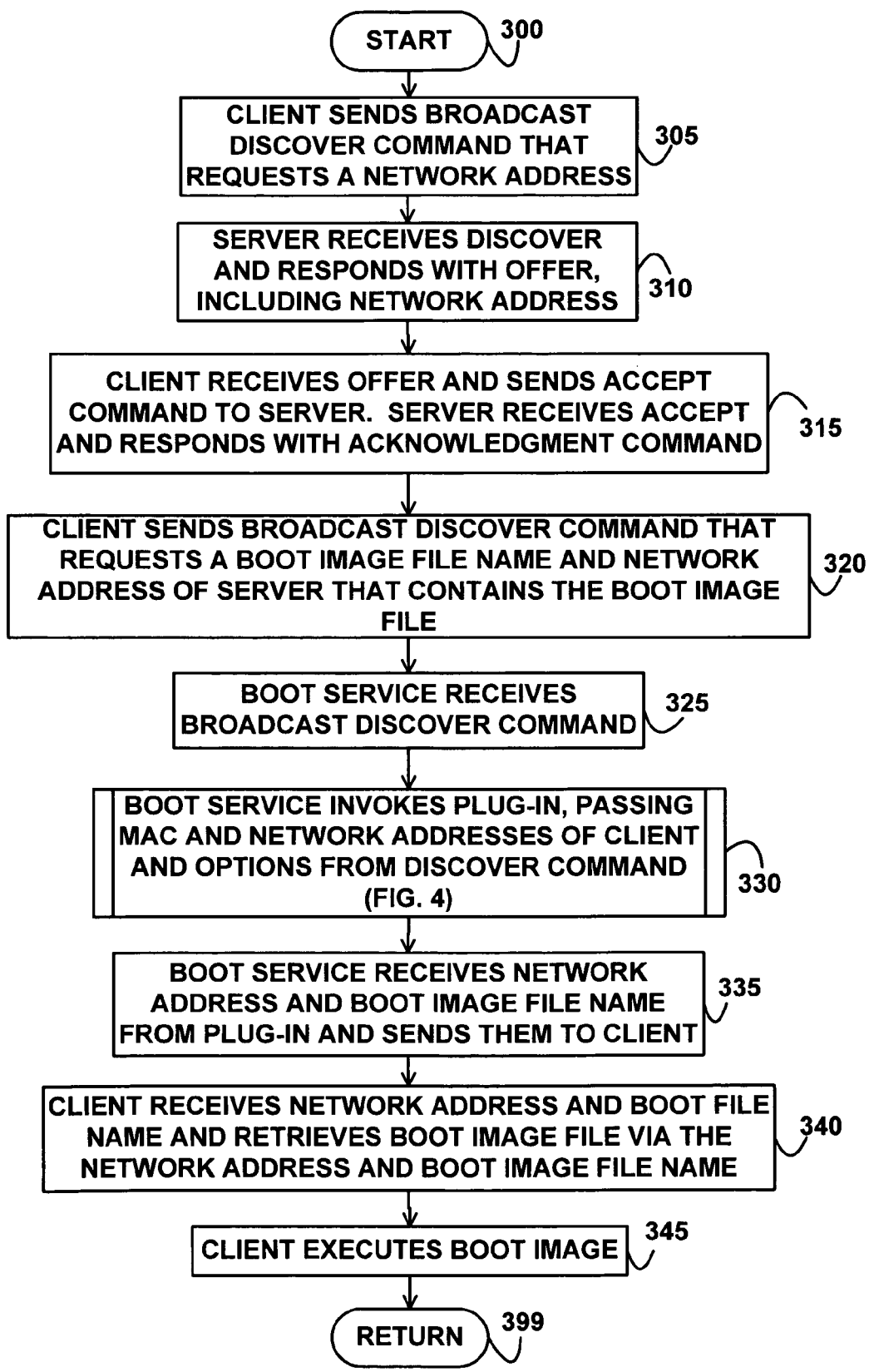
FIG. 3 depicts a flowchart of example processing for booting a client via a boot image, according to an embodiment of the invention.

FIG. 3 depicts a flowchart of example processing for booting the client computer system 132 via a boot image 168, according to an embodiment of the invention. Control begins at block 300. Control then continues to block 305 where the client computer system 132 sends a broadcast discover command to the network 130, requesting to be assigned a network address. Control then continues to block 310 where the server computer system 134 responds with an offer, which includes a network address. Control then continues to block 315 where the client computer system 132 receives the offer and sends an accept command to the server computer system 134, which communicates the acceptance of the network address to the server computer system 134. The server computer system 134 receives the accept command and responds with an acknowledgment command to the client computer system 132.

Control then continues to block 320 where the client computer system 132 sends a broadcast discover command to the network 130, which requests a name of a boot image file 168 and a network address of the boot server computer system 100 that contains the boot image file 168. The broadcast discover command includes the MAC address of the client computer system 132, the network address of the client computer system 132, and/or optional options data. Control then continues to block 325 where the boot service 160 at the boot server computer system 100 receives the broadcast discover command from the client computer system 132.

Control then continues to block 330 where the boot service 160 invokes the plug-in 162, passing the MAC address of the client computer system 132, the network address of the client computer system 132, and/or options data from the broadcast discover command, as further described below with reference to FIG. 4.

Control then continues to block 335 where the boot service 160 receives the network address of the boot server 100 and the name of the boot image 168 from the plug-in 162 and sends them to the client computer system 132.

Control then continues to block 340 where the client computer system 132 receives the network address of the boot server computer system 100 and the name of the boot image 168 and retrieves the boot image 168 via the received network address and the boot image file name. Control then continues to block 345 where the client computer system 132 executes the boot image 168. Control then continues to block 399 where the logic of FIG. 3 returns.

Figure 4:
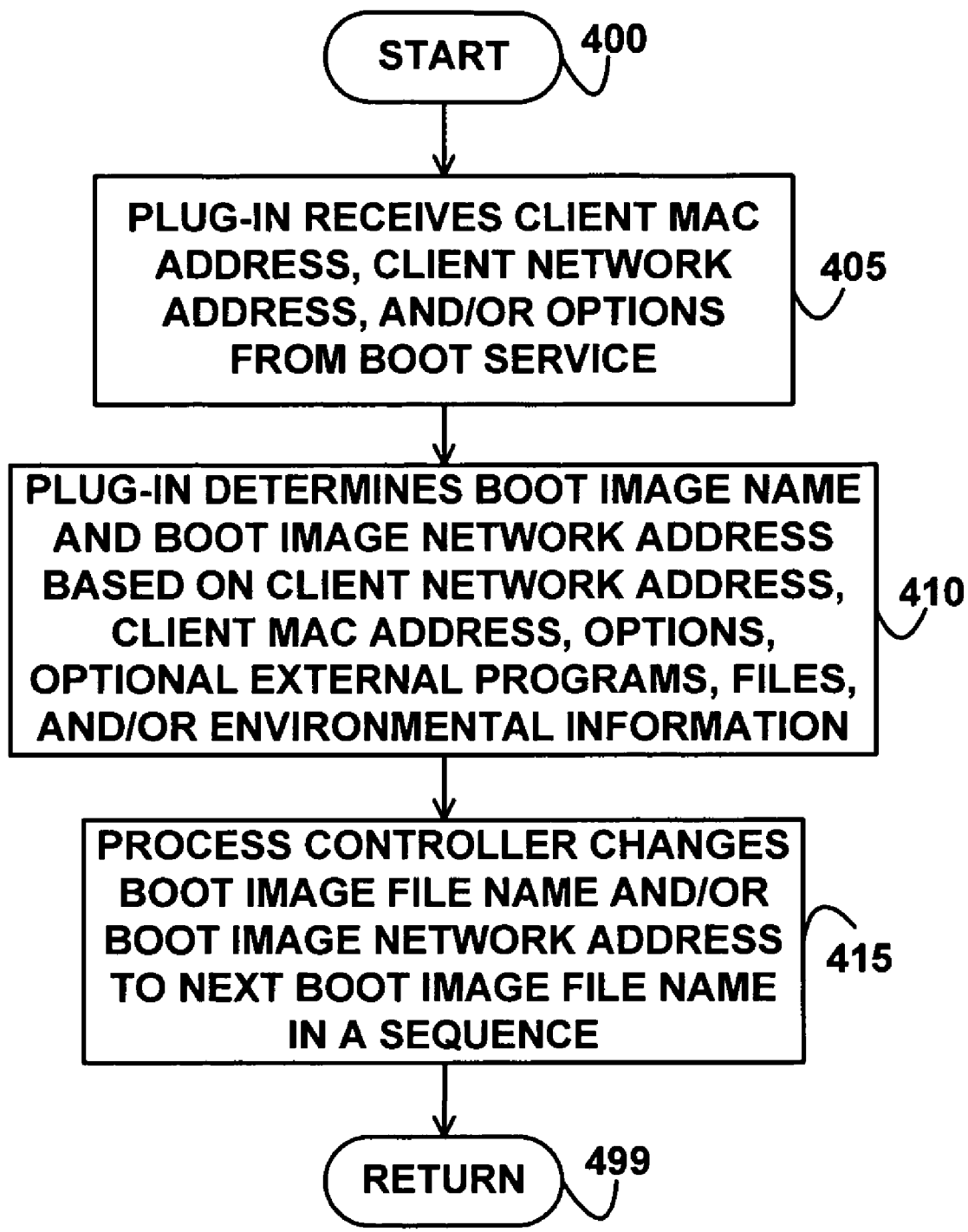
FIG. 4 depicts a flowchart of example processing for selecting a boot image, according to an embodiment of the invention.

FIG. 4 depicts a flowchart of example processing for selecting a boot image 168, according to an embodiment of the invention. Control begins at block 400. Control then continues to block 405 where the plug-in 162 receives the MAC address of the client computer system 132, the network address of the client computer system 132, and/or optional options data from the broadcast discover command.

Control then continues to block 410 where the plug-in 162 determines the boot image 168 specified in the boot image file name field 235 and the boot image network address specified in the boot image network address field 240 based on the received client network address, the received client MAC address, and/or the received options via the client MAC address field 220, the client network address field 225, and/or the options field 230, respectively, in the boot table 164. In another embodiment, the plug-in 162 may also determine the boot image 168 and/or the boot image network address based on optional external programs, files, and/or environmental information.

Control then continues to block 415 where the process controller 166 changes the boot image file name 235 and/or boot image network address 240 in the boot table 164 to the next file name and/or network address in a sequence. In various embodiments, the process controller 166 modifies the information in the boot table 164, such as the boot image file name 235 and/or the boot image network address 240, in order to send a series of different boot images 168 to the client computer system 132 as part of a manufacturing, installation, or test sequence. Thus, the logic of FIG. 3 may be re-executed, in order to send the changed name of the boot image or the changed address of the boot server to the client computer system 132, and hence the boot image 168 associated with the address of the client computer system 132 changes over time.

Control then continues to block 499 where the logic of FIG. 4 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   receiving a command at a boot server from a client, wherein the command requests a name of a boot image and a network address of the boot server that contains the boot image;
   in response to the receiving the command at the boot server from the client, invoking a plug-in at the boot server, wherein the plug-in determines the name of the boot image and the network address of the boot server that contains the boot image based on an address of the client that sent the command, wherein the boot image associated with the address of the client changes over time, wherein after the plug-in at the boot server determines the name of the boot image associated with the address of the client, the plug-in at the boot server changes the name of the boot image associated with the address of the client to a second name of a second boot image in a sequence, and wherein the plug-in at the boot server changes the network address of the boot server to a second network address of a second boot server;
   sending the name of the boot image and the network address of the boot server that contains the boot image from the boot server to client that sent the command, wherein the client retrieves the boot image via the name of the boot image and the network address of the boot server that contains the boot image, and wherein the boot image initializes the client when executed at the client;
   receiving a second command at the boot server from the client;
   in response to the receiving the second command at the boot server from the client, invoking the plug-in at the boot server, wherein the plug-in determines the second name of the second boot image and the second network address of the second boot server associated with the address of the client; and
   sending the second name of the second boot image and the second network address of the second boot server from the boot server to the client in response to the second command from the client, wherein the client retrieves the second boot image via the second name of the second boot image and the second network address of the second boot server, wherein the second boot image initializes the client when executed at the client.

2. The method of claim 1, wherein the address of the client comprises a network address.

3. The method of claim 2, wherein the address of the client comprises a MAC address.

4. A storage medium encoded with instructions, wherein the instructions when executed comprise:
   receiving a command at a boot server from a client, wherein the command requests a name of a boot image and a network address of the boot server that contains the boot image;
   in response to the receiving the command at the boot server from the client, invoking a plug-in at the boot server, wherein the plug-in determines the name of the boot image and the network address of the boot server that contains the boot image based on an address of the client that sent the command, wherein the boot image associated with the address of the client changes over time, wherein after the plug-in at the boot server determines the name of the boot image associated with the address of the client, the plug-in at the boot server changes the name of the boot image associated with the address of the client to a second name of a second boot image in a sequence, and wherein the plug-in at the boot server changes the network address of the boot server to a second network address of a second boot server;
   sending the name of the boot image and the network address of the boot server that contains the boot image from the boot server to the client that sent the command, wherein the client retrieves the boot image via the name of the boot image and the network address of the boot server that contains the boot image, and wherein the boot image initializes the client when executed at the client;
   receiving a second command at the boot server from the client;
   in response to the receiving the second command at the boot server from the client, invoking the plug-in at the boot server, wherein the plug-in determines the second name of the second boot image and the second network address of the second boot server associated with the address of the client; and
   sending the second name of the second boot image and the second network address of the second boot server from the boot server to the client in response to the second command from the client, wherein the client retrieves the second boot image via the second name of the second boot image and the second network address of the second boot server, wherein the second boot image initializes the client when executed at the client.

5. The storage medium of claim 4, wherein the address of the client comprises a network address.

6. The storage medium of claim 4, wherein the address of the client comprises a MAC address.

7. A computer system comprising a processor communicatively connected to the storage medium of claim 4.

8. A method for configuring a boot server, comprising:

configuring the boot server to receive a command from a client, wherein the command requests a name of a boot image and a network address of the boot server that contains the boot image;

configuring the boot server to, in response to the receive of the command from the client invoke a plug-in at the boot server wherein the plug-in at the boot server determines the name of the boot image and the network address of the boot server that contains the boot image based on an address of the client that sent the command, wherein the boot image associated with the address of the client changes over time, wherein after the plug-in at the boot server determines the name of the boot image associated with the address of the client the plug-in at the boot server changes the name of the boot image associated with the address of the client to a second name of a second boot image in a sequence, and wherein the plug-in at the boot server changes the network address of the boot server to a second network address of a second boot server;

configuring the boot server to send the name of the boot image and the network address of the boot server that contains the boot image to the client that sent the command, wherein the client retrieves the boot image via the name of the boot image and the network address of the boot server that contains the boot image, and wherein the boot image initializes the client when executed at the client;

configuring the boot server to receive a second command from the client;

configuring the boot server to, in response to the receive of the second command at the boot server from the client, invoke the plug-in at the boot server, wherein the plug-in determines the second name of the second boot image and the second network address of the second boot server associated with the address of the client; and configuring the boot server to send the second name of the second boot image and the second network address of the second boot server from the boot server to the client in response to the second command from the client, wherein the client retrieves the second boot image via the second name of the second boot image and the second network address of the second boot server, wherein the second boot image initializes the client when executed at the client.

9. The method of claim 8, wherein the address of the client comprises a network address.

10. The method of claim 8, wherein the address of the client comprises a MAC address.

* * * * *